M. Ludlum,
Flower Pot.
No. 100,300. Patented Mar. 1, 1870
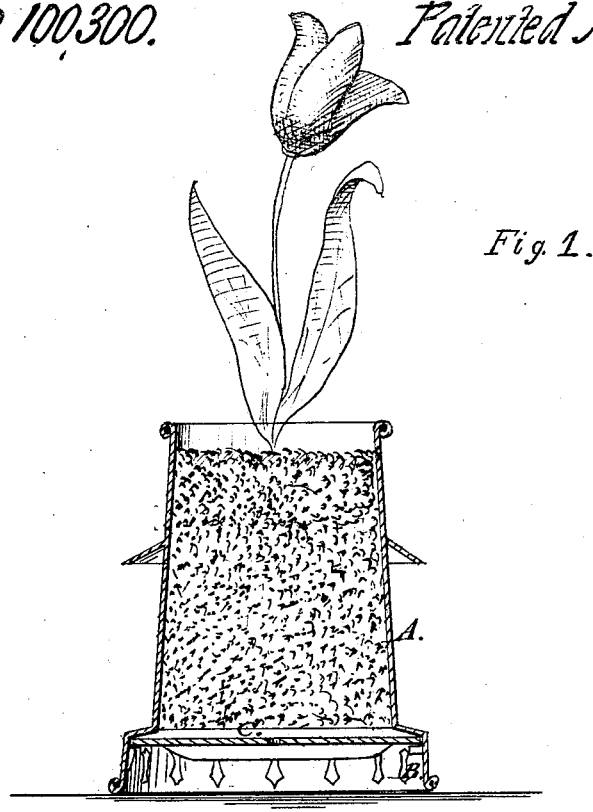
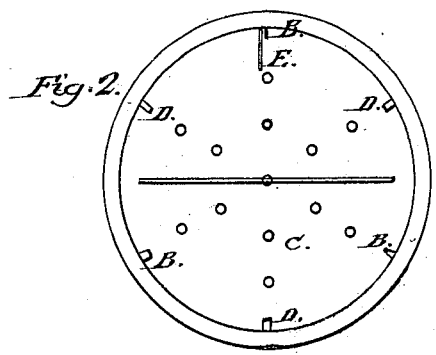
Witnesses:
A. F. Clark
Jno. F. Brooks
Inventor:
M. Ludlum
per
Munn & Co.
attorney

United States Patent Office.

MATHIAS LUDLUM, OF WILLISTON, VERMONT.

Letters Patent No. 100,300, dated March 1, 1870.

IMPROVEMENT IN FLOWER-POTS.

The Schedule referred to in these Letters Patent and making part of the same.

To all whom it may concern:

Be it known that I, MATHIAS LUDLUM, of Williston, Chittenden county, State of Vermont, have invented a new and improved Flower-Pot; and I do hereby declare that the following is a full, clear, and exact description thereof, which will enable others skilled in the art to make and use the same, reference being had to the accompanying drawing forming part of this specification.

This invention relates to improvements in flower-pots, and has for its object to provide pots from which the plants, with the earth enveloping the roots, may be more readily transplanted, and an improvement in form calculated to give greater room for the roots.

Figure 1 represents a sectional elevation of my improved flower-pot, and

Figure 2 represents a plan of the bottom of the same.

Similar letters of reference indicate corresponding parts.

Hitherto these flower-pots have necessarily been made larger at the top than at the bottom, for the purpose of removing the earth with the plants, in transplanting. This shape is not well adapted to the natural requirements of the plants, for the roots expand as they grow downward, requiring greater breadth at or toward the bottom, which cannot be had if the plants are to be removed at the top in the common way. I have, therefore, provided flower-pots of increasing diameter toward the bottom, and have made the bottoms removable, as follows, whereby I not only adapt the pots more perfectly to the natural requirements of the plants, but greatly facilitate the removal of the same in transplanting.

The cylindrical or tubular parts A of the pots, which are made without bottoms and larger at the base than at the top, are provided, a short distance above the base, inside thereof, with lugs B, preferably three in number, having shoulders at the upper ends, and all in the same horizontal plane, and the bottom C made in the form of their circular disks, of the same diameter as the internal diameter of the parts A.

Above, these lugs are provided with corresponding clefts, D, so that, by adjusting the clefts to coincide with the projections, the bottoms may be inserted above the said projections, and be turned around, moving the clefts away from the projections, whereby the bottoms will be retained.

A stop, E, may be placed on the bottom, to arrest the turning of the bottom when the clefts are about equidistant between the projections.

The opening at the edge of bottom admits air freely to the roots of the plants.

For removing the plants, the pots may be held slightly above the ground in one hand, and the bottoms turned by the other, so that they and the contents will readily fall out in a way much less injurious to the plants than the common way of turning the plants and the earth bottom up, or nearly so, into the hand.

The mode of fastening the bottoms may be varied, and I do not confine myself to the precise mode herein shown.

Having thus described my invention,

What I claim as new, and desire to secure by Letters Patent, is—

A flower-pot provided with a removable bottom, having the recesses D and stop E, and the shouldered legs B, as shown and described.

The above specification of my invention signed by me this 6th day of August, 1869.

M. LUDLUM.

Witnesses:
W. N. MURRAY,
GEO. MORTON.